(12) United States Patent
Karakotsios et al.

(10) Patent No.: US 9,574,894 B1
(45) Date of Patent: Feb. 21, 2017

(54) BEHAVIOR-BASED INFERENCES AND ACTIONS

(75) Inventors: Kenneth Karakotsios, San Jose, CA (US); Bradley Bozarth, Sunnyvale, CA (US); Ian W. Freed, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 877 days.

(21) Appl. No.: 12/950,929

(22) Filed: Nov. 19, 2010

(51) Int. Cl.
| | |
|---|---|
| G01C 21/34 | (2006.01) |
| G01C 21/36 | (2006.01) |
| G08G 1/00 | (2006.01) |
| G07C 5/08 | (2006.01) |
| G06Q 10/08 | (2012.01) |
| G01C 21/26 | (2006.01) |

(52) U.S. Cl.
CPC .......... *G01C 21/3617* (2013.01); *G01C 21/26* (2013.01); *G06Q 10/08* (2013.01); *G07C 5/085* (2013.01); *G07C 5/0858* (2013.01); *G08G 1/20* (2013.01)

(58) Field of Classification Search
USPC ............... 701/209, 409–411, 408, 532–533, 55–56,701/468–469, 424, 467–469, 521–522, 526; 342/350, 450, 431, 457; 455/456.1, 457, 455/456.3; 705/500, 7.12, 14.4, 14.63; 715/840; 340/539.13; 706/21
See application file for complete search history.

(56) References Cited

U.S. PATENT DOCUMENTS

| | | | | |
|---|---|---|---|---|
| 7,835,859 B2* | 11/2010 | Bill | ..................... | G01C 21/3617 340/905 |
| 7,903,029 B2* | 3/2011 | Dupray | ......................... | 342/457 |
| 8,478,642 B2* | 7/2013 | Dey | .................... | G01C 21/3484 705/14.4 |
| 8,688,517 B2* | 4/2014 | Lutnick | .................. | G06Q 30/02 705/14.1 |
| 8,744,766 B2* | 6/2014 | Rakshit | .............. | G01C 21/3461 340/632 |
| 9,020,523 B2* | 4/2015 | Moeglein | .............. | G01S 5/0205 370/338 |
| 9,163,952 B2* | 10/2015 | Viola | .................. | G01C 21/3617 |
| 9,417,074 B2* | 8/2016 | Leader | ............... | G01C 21/3617 |
| 2001/0022558 A1* | 9/2001 | Karr et al. | ..................... | 342/450 |
| 2005/0222933 A1* | 10/2005 | Wesby | ........................... | 705/36 |

(Continued)

OTHER PUBLICATIONS

Robots asking for directions—The willingness of passers-by to support robots; Weiss, Astrid et al. Human-Robot Interaction (HRI), 2010 5th ACM/IEEE International Conference on; Digital Object Identifier: 10.1109/HRI.2010.5453273 Pub. Yr. 2010 , pp. 23-30.*

(Continued)

*Primary Examiner* — Cuong H Nguyen
(74) *Attorney, Agent, or Firm* — Polsinelli LLP

(57) ABSTRACT

The position and/or movement of at least one device for a user can be monitored over time, and various types of information inferred based on patterns in that user behavior. A device can determine various locations where a user typically stays for a period of time, as well as the routes the user takes to get to those locations. Based upon time, date, and various other information, the device can infer the type of location and/or route, as well as the likelihood that the user will take a given route to one of those locations at any time. By being able to infer future actions and locations of the user at certain times, a device can proactively provide a variety of functionality to the user, such as to provide suggested alternative routes, move meetings, notify others of estimated times of arrival, and perform other such tasks.

19 Claims, 9 Drawing Sheets

(56) References Cited

U.S. PATENT DOCUMENTS

| | | | | |
|---|---|---|---|---|
| 2007/0005243 | A1* | 1/2007 | Horvitz | G01S 19/14 701/484 |
| 2007/0005419 | A1* | 1/2007 | Horvitz | G06Q 30/0241 701/533 |
| 2007/0006098 | A1* | 1/2007 | Krumm | G06F 17/3087 715/825 |
| 2007/0010942 | A1* | 1/2007 | Bill | 701/209 |
| 2007/0185739 | A1* | 8/2007 | Ober et al. | 705/3 |
| 2009/0164236 | A1* | 6/2009 | Gounares et al. | 705/2 |
| 2009/0216831 | A1* | 8/2009 | Buckner | 709/202 |
| 2009/0259549 | A1* | 10/2009 | Winand et al. | 705/14.35 |
| 2010/0106603 | A1* | 4/2010 | Dey et al. | 705/14.63 |
| 2010/0164753 | A1* | 7/2010 | Free | 340/932 |
| 2011/0022443 | A1* | 1/2011 | Partridge et al. | 705/10 |
| 2014/0372030 | A1* | 12/2014 | Leader | G01C 21/20 701/526 |

OTHER PUBLICATIONS

Destination-aware non-GPS positioning using predictive contexts; Chih-Pei Yang et al., ITS Telecommunications (ITST), 2012 12th International Conf. on; Digital Object Id.: 10.1109/ITST.2012. 6425233; Pub Yr: 2012 , pp. 517-521.*

HDA: Heading Direction Angle based Multicast Routing for Mobile Adhoc Networks;Latha, P. et al.; Advance Computing Conference, 2009. IACC 2009. IEEE Inter.; Digital Object Id. 10.1109/IADCC. 2009.4809162; Pub Yr: 2009 , pp. 1067-1072.*

On predicting vehicle tracks;Gong, Xiaowen ; Manoharan, Sathiamoorthy; Communications, Computers and Signal Processing (PacRim), 2011 IEEE Pacific Rim Conf. on; Digital Object Identifier: 10.1109/PACRIM.2011.6032863 Publication Year: 2011 , pp. 31-36.*

HDA: Heading Direction Angle based Multicast Routing for Mobile Adhoc Networks; Latha, P. ; Ramachandran, R. Advance Computing Conference, 2009. IACC 2009. IEEE Internationa; Digital Object Identifier: 10.1109/IADCC.2009.4809162; Publication Year: 2009 , pp. 1067-1072.*

Heading Routing Protocols: Mobility-Based Routing for Ad-Hoc Networks; Al-Akaidi, M. ; Alchaita, M. ; Ivins, J. 3G and Beyond, 2005 6th IEE International Conference on; Publication Year: 2005 , pp. 1-5.*

A two-level protocol to answer private location-based queries; Vishwanathan, R. ; Yan Huang; Intelligence and Security Informatics, 2009. ISI '09. IEEE International Conference on; DOI: 10.1109/ ISI.2009.5137287; Publication Year: 2009 , pp. 149-154.*

Assessment of camera capture for GPS RFI monitor; Chun-Kai Feng ; Shau-Shiun Jan ; Johnson, T. ; Akos, D.; Position, Location and Navigation Symposium—PLANS 2014, 2014 IEEE/ION; DOI: 10.1109/PLANS.2014.6851502; Publication Year: 2014 , pp. 1272- 1281.*

Fraud Detection From Taxis' Driving Behaviors; Siyuan Liu ; Ni, L.M. ; Krishnan, R.; Vehicular Technology, IEEE Transactions on vol. 63 , Issue: 1; DOI: 10.1109/TVT.2013.2272792; Publication Year: 2014 , pp. 464-472.*

Data fusion approach for altitude location error estimation for unmanned aerial vehicle using federated filter; Yong-hong Hu ; Zhong-Ke Shi ; Wei Tang; Industrial Technology, 2005. ICIT 2005. IEEE International Conference on; DOI: 10.1109/ICIT.2005. 1600731 Publication Year: 2005 , pp. 726-728.*

A Map Matching Algorithm for Car Navigation Systems that Predict User Destination; Miyashita, K. ; Terada, T. ; Nishio, S. Advanced Information Networking and Applications—Workshops, 2008. AINAW 2008. 22nd International Conference on DOI: 10.1109/ WAINA.2008.242; Publication Year: 2008 , pp. 1551-1556.*

Learning to Predict Driver Route and Destination Intent; Simmons, R. ; Browning, B. ; Yilu Zhang ; Sadekar, V.; Intelligent Transportation Systems Conference, 2006. ITSC '06. IEEE; DOI: 10.1109/ ITSC.2006.1706730; Publication Year: 2006 , pp. 127-132.*

Object monitoring by prediction and localisation of nodes by using Ant Colony Optimization in Sensor Networks; S. Niranchana; E. Dinesh; 2012 Fourth International Conference on Advanced Computing (ICoAC); Year: 2012; pp. 1-8, DOI: 10.1109/ICoAC.2012. 6416828.*

Location-Based Routing for Opportunistic Networks; Gianpiero Costantino; Rajib Ranjan Maiti; Fabio Martinelli; Paolo Santi Mobile Ad Hoc and Sensor Systems (MASS), 2015 IEEE 12th International Conference on; Year: 2015; pp. 452-453, DOI: 10.1109/MASS.2015.37.*

Identifying meaningful locations; Petteri Nurmi; Johan Koolwaaij; Mobile and Ubiquitous Systems—Workshops, 2006. 3rd Annual International Conference on; Year: 2006; pp. 1-8, DOI: 10.1109/ MOBIQW.2006.361761.*

Estimating flexible route choice models using sparse data; Masoud Fadaei Oshyani; Marcus Sundberg; Anders Karlström; 2012 15th International IEEE Conference on Intelligent Transportation Systems; Year: 2012; pp. 1215-1220, DOI: 10.1109/ITSC.2012. 6338676.*

* cited by examiner

BEHAVIOR-BASED INFERENCES AND ACTIONS

BACKGROUND

Many people are increasingly relying upon portable devices to store, track, and update various types of information and handle various types of tasks. For example, many users rely upon electronic calendars synchronized across one or more devices to keep track of the user's schedule, and often rely upon the device to notify the user of certain upcoming events. A downside to such use is that a user must typically input all relevant information into the device, and often must access multiple applications in order to get all the information a user needs. For example, a user might have to manually enter information such as the user's home address and work address into a contact application, and if the user wants to get directions between the two locations the user must open a mapping application and select or re-enter that information. If the user wants to obtain traffic information about the user's commute between those locations, the user must open a traffic application and enter the route between those locations. If there is an accident and the user wants to find another way home, the user often must reopen the mapping program and attempt to determine an alternate route. If the user is going to be late as a result, the user often has to manually text, call, or otherwise manually notify someone at home. As devices become ever more intelligent, and offer additional types of functionality, it becomes increasingly undesirable to continue to have to access different applications and manually enter information, as well as to require the user to perform a number of other such tedious tasks.

BRIEF DESCRIPTION OF THE DRAWINGS

Various embodiments in accordance with the present disclosure will be described with reference to the drawings, in which.

DETAILED DESCRIPTION

Figure 1:
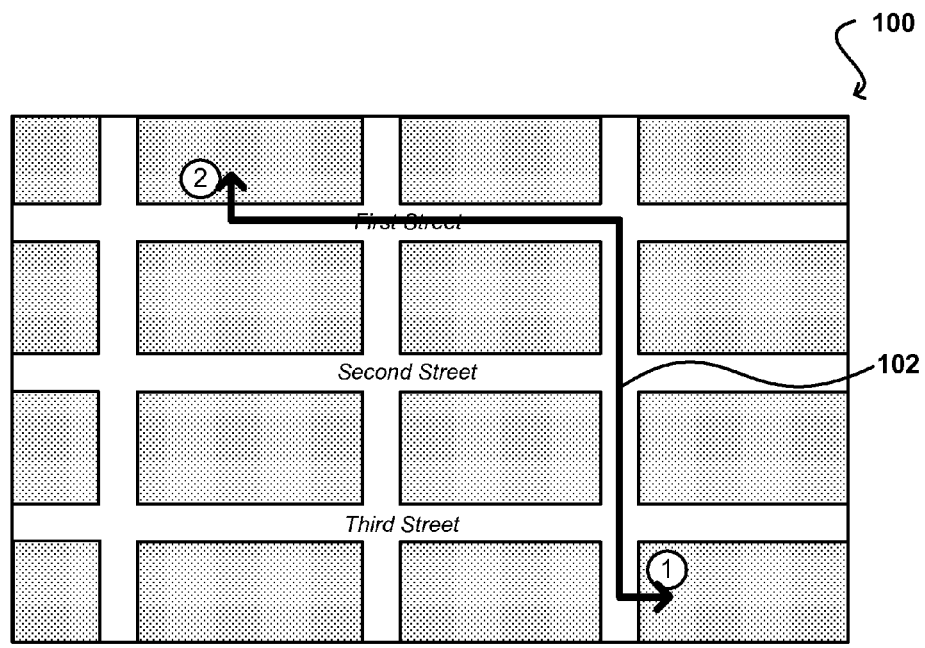
FIG. 1 illustrates an example situation wherein position information is used to determine a route between dwells in accordance with at least one embodiment.

Systems and methods in accordance with various embodiments of the present disclosure overcome one or more of the above-referenced and other deficiencies in conventional approaches to interfacing between a computing device and a user. In various embodiments, information such as positional data and movement data with respect to time can be captured for a user and analyzed to attempt to infer various aspects of that user's behavior. For example, a portable computing device such as a smart phone or personal data assistant (PDA) might be carried by a user a significant portion of the day, particularly while the user is away from home. If the position of that computing device is able to be determined and monitored over time, using a component such as a global positioning system (GPS) of the device or an approach such as triangulation via cellular towers, for example, then patterns of movement can be inferred for the user. The patterns can be segmented into any of a number of different categories, such as "dwells" where a user typically remains relatively stationary (e.g., within a specified range, distance, boundary, degree of certainty, etc.) for at least a period of time, and "routes" that are typically taken by a user between those dwells. Based on factors such as the time of day and days of the week that the user typically follows these patterns, various user actions can be inferred and used to provide various functionality to the user. An advantage to being able to infer such information is that various functionality can be provided without the need for the user to manually input or otherwise provide a significant amount of data needed to otherwise provide that functionality.

For example, a device might be able to infer the location of the user's home and place of business, based upon factors such as the times at which the user's position is at these locations. Further, the device might be able to determine primary and alternate commute routes that the user takes to get to, and from, work. While certain programs determine routes to take between points, approaches in accordance with various embodiments instead learn the preferred routes taken by a user based on that user's actual behavior. Thus, if the device infers that the user is going home on a primary commute route and detects an accident along the way, the device can suggest an alternative route that is actually preferred by the user, instead of a route determined by a conventional route determination algorithm. Such an approach can be beneficial as there might be certain routes that a user does not want to take for any of a number of reasons, or routes that the user enjoys taking if the primary route becomes undesirable for any reason.

Other advantages can be obtained as well, as a computing device for a user often has access to other types of information for the user. For example, the device can have access to a user's calendar, task list, and contact information. Being able to determine current position information for a user, knowing where the user has to go, and knowing information about the route the user is likely to take, the device can perform tasks such as to remind the user when to leave in order to make a meeting on time, notify a person with whom the user is scheduled to meet if the user is likely to be late, or move a meeting to ensure the user has sufficient time to make the meeting. The device can perform other tasks as well, such as to prompt the user to stop at a store or other location to perform an item on the task list, such as to pick up an item, when the user's route likely will take the user by that store and the user has sufficient time before the user's next appointment or dwell.

In some embodiments, a logically centralized system or service can communicate with multiple devices associated with a user, and can aggregate this information in order to infer user behavior. For example, a user might have a navigation system in the user's car that can capture movement data for the user. The user might have an electronic book reader that the user takes when the user is on a train or a bus. The user also might have a personal media player that the user takes when the user goes jogging. In order to get a better overall view of user behavior, positional information from any or all of these can be aggregated to fill in user behavior for specific periods. Based on information such as the speed of the user, different types of routes can be determined as well. For example, based upon speed (and potentially other information such as the type of device) a device can determine whether a user is likely walking, running, or taking a mode of transpiration.

Knowing about the user's routes and dwells also enables a device to infer where a user is going when a user makes a certain movement within a certain range of time, and take any of a number of actions based on that inference. For example, when a device determines that a user is following a portion of a route at a certain time, such as a commute route home after the end of the work day, the device can notify a significant other that the user is on the way home, and can provide an estimated time of arrival based upon past behavior, current conditions, and other such information. If the user picks up a child on the way home, the device can notify that child with similar information. If the child has a device with similar information, the device can notify the child whether the parent has left work or not, when the parent is likely to pick up the child, and if the parent is running late can potentially suggest other options based on the child's past behavior, such as to take the bus or ride home with a neighbor.

A user also can authorize the device to manage certain aspects of the user's calendar or other such information. For example, if the user typically goes to get coffee every day at a certain time, the device might add that recurring event to the user's calendar as a certain type of event. If the user goes to a gym a couple times a week, but does not care when those times are, the device can schedule those times based on past behavior, upcoming schedule, and other such information, and can have the ability to change those times as necessary. The device also can proactively schedule, adjust, or move meetings as well based on similar and other types of information.

Where multiple devices are able to communicate, the activities of multiple users can be coordinated as well. For example, devices can setup meetings and even select appropriate locations based on factors such as each user's schedule, where the user is, where the user is likely to be, and which route the user is likely to take. The progress of each user can be monitored as well, such that the other users can be notified if a user is going to be late, has a conflict arise, etc.

In some embodiments, a device (or system or service in communication with the device) can expose one or more interfaces, such as client-facing application programming interfaces (APIs) that enable third party providers, developers, or other such entities to obtain various types of information for inferring user behavior (or other such purposes). For example, a device might monitor or at least capture various types of information for a user, such as motion, position, rate of movement, acceleration, and other such information at various times. A third party might be able to specify, through at least one of the APIs, a set of primitives or other such information to receive at certain times, including information such as position, direction, and time information, and can use that information to track and infer user behavior. Based at least in part upon those inferences, the third party can utilize another API to provide instructions or communications to the device, such as to provide alternate routes, move meeting times, or provide any other such functionality discussed or suggested herein. In some instances, the commands can cause the device to automatically perform certain actions without requiring user interaction (where the user has allowed such actions to be taken automatically).

Various other functions and advantages are described and suggested below as may be provided in accordance with the various embodiments.

FIG. 1 illustrates an example map 100 that can be used to track and/or infer user location, movement, destinations, and other such information in accordance with various embodiments. It should be understood that devices, applications, and services do not necessarily think in terms of maps, but may think in terms of positions, coordinates, routes, and/or other such information, and maps such as that in FIG. 1 may only be visual representations generated in response to a user requesting specific types of information. For purposes of explanation the description will refer to a selection of maps, but it should be understood that such renderings are used for purposes of explanation with respect to various aspects of the described embodiments.

As discussed, a user can carry or otherwise be associated with any of a number of devices which can each record or obtain position and/or movement information. For example, a user might have a navigation system in the user's car that can continually determine the location of the vehicle during operation. Further, the user might have a smart phone that determines location information based upon global positioning system (GPS) data, cellular signal triangulation, or any other appropriate mechanism. Further still, the user might have a watch, tablet computer, or any of a number of other such devices that can track position information over at least a period of time. A user can also have any of a number of devices that use accelerometers or other such location and motion determination devices, as well as cameras and other elements that can be used to determine motion, location, and other such information. In some embodiments, at least some of these devices can communicate over a network with at least one system or service operable to combine the information to obtain position information for a user over a larger range of time. For example, information from the user's car may be most useful when the car is in motion, but may be of limited use at other times. If a user logs into a computer at work, information for that computer can be used during operation to determine the current position of the user. If the user turns on an electronic book reader or tablet computer while riding the bus, for example, information can be obtained for the current position of the user. In many cases a system might rely upon a single device, such as a cellular phone that is likely with the user a majority of the time, but in other embodiments information from multiple devices might be included for those times when the user is not carrying the phone, the phone cannot get a signal, etc.

In various embodiments, position information for a user is monitored over time. One or more algorithms can be executed against the position information in an attempt to recognize patterns or other repeating occurrences in the user's movement and/or position. For example, consider the example map 100 of FIG. 1, which illustrates a view of streets near a user's home. Over time, the user will likely travel along most, of not all, of the roads shown. There can be specific portions of these roads, however, that are traveled more often, at similar times or with similar endpoints. For example, there is a route 102 illustrated on the map that the user might normally take in one direction in the morning on most weekdays, and in the opposite direction in the evening on most weekdays. Using such information, a number of things might be inferred for the user. First, it could be inferred that this path is likely a commute route. The device can attempt to identify paths that are frequency taken by a user, for example, and can store these paths as specific "routes" or other such data collections for the user. Second, if the position of the user during the night, or for another extended period of time, is typically at or near position 1, it can be inferred that position 1 likely corresponds to the user's home. Any location where the user often or regularly spends at least a minimum amount of time can be stored as a "dwell" location, or similar piece of information, which the device can use as discussed later herein to predict destinations, routes, and other types of information. Similarly, it can be inferred that position 2 corresponds to the location of the user's daily activity, be it a workplace, school, or other such location.

Based at least on this information, at least one device, system, application, service, or other such entity (hereinafter "device" for purposes of simplicity) could determine information for this "route" and store information to be used in inferring user action and/or related information. For example, the device might be able to infer that if tomorrow is a weekday, based upon calendar information stored by the device, it is likely that the user will follow the commute route from position 1 to position 2 within a specific time frame in the morning, and from position 2 to position 1 in the evening. If there is a sufficient amount of data, the device also can predict how long it will take the user to complete the route in each direction, at each time of day. For example, the device might determine the commute time each day over a period of days, such as the last week or last month, and take an average or other combination of those commute times. The commute times can also be broken down more granularly, such as by direction, day of the week, time of day, and other such factors.

Further, information about the current direction and speed of the user along a route at a current time can be used to update the prediction of an arrival time for the user. For example, if there is traffic along a particular stretch of road and the user is moving slower than usual, the device can analyze the differences in speed and/or progress with respect to prior commute data and predict an updated estimate of the time of arrival. The device also can use other information, such as traffic information available from an appropriate service, to predict the time of arrival. If the device communicates with a logically centralized system or service (e.g., a service available over a network) which collects information for multiple users, information for users further along the route also can be aggregated and analyzed to make more accurate predictions of the arrival time.

In at least some embodiments, the device can use similar information to determine the arrival time along alternate routes. These routes could be alternate routes that the user has previously taken, or other routes determined by a navigation application or other such source. The system or service could look at any available information, including historical data for the user and/or any available real-time data, to attempt to predict the arrival time if any of these other routes are taken, and then suggest alternate routes where those routes would likely be faster.

Over time, other routes and dwells can be inferred as well, based upon the monitored user location and/or other such information. For example, consider the example map 200 of FIG. 2. This example includes information for multiple routes, or multiple variations of the same route. For example, the user might almost always start at dwell position 1 and end up at dwell position 2 on weekday mornings, corresponding to the "commute" route described above. On certain days, however, the user might take a detour 202 and stop at dwell position 3 before going to dwell position 2. If the user leave early on those days, then on a day when the user leaves early the device can infer that the user is going to stop at dwell position 3 before going on to position 2. Otherwise, the device might infer that the user is going to dwell position 3 if the user turns along the portion of the route 202 that the user takes to get to dwell position 3.

Similarly, the device might determine that the user during certain times of the year stops certain days of the week at dwell position 4, taking a different route 204 to get from dwell position 2 to dwell position 1. Thus, at certain times, or based upon the direction from which the user leaves dwell position 2, for example, the device can infer that the user is going to stop at dwell position 4 then move on to dwell position 1 along the determined alternate route 204.

In some cases, the device can also utilize other information to assist in determining and/or inferring aspects of the user's routes. For example, if the device has access to address information (such as through an address service or online white pages) then the device might be able to determine that dwell location 1 corresponds to a residence, dwell location 2 corresponds to a business, and dwell location 3 corresponds to a gym. The device can potentially cross-reference this or similar information in the user's contacts or electronic address book, as may be stored by the device, to determine that the residence at dwell position 1 in fact corresponds to the user's home, and the business at dwell position 2 corresponds to the user's place of employment. Even though the gym might not be in the user's address book, the type of location and information such as the frequency and/or duration of visit can help to infer that the user works out at that gym certain days or times of the week.

Figure 2:
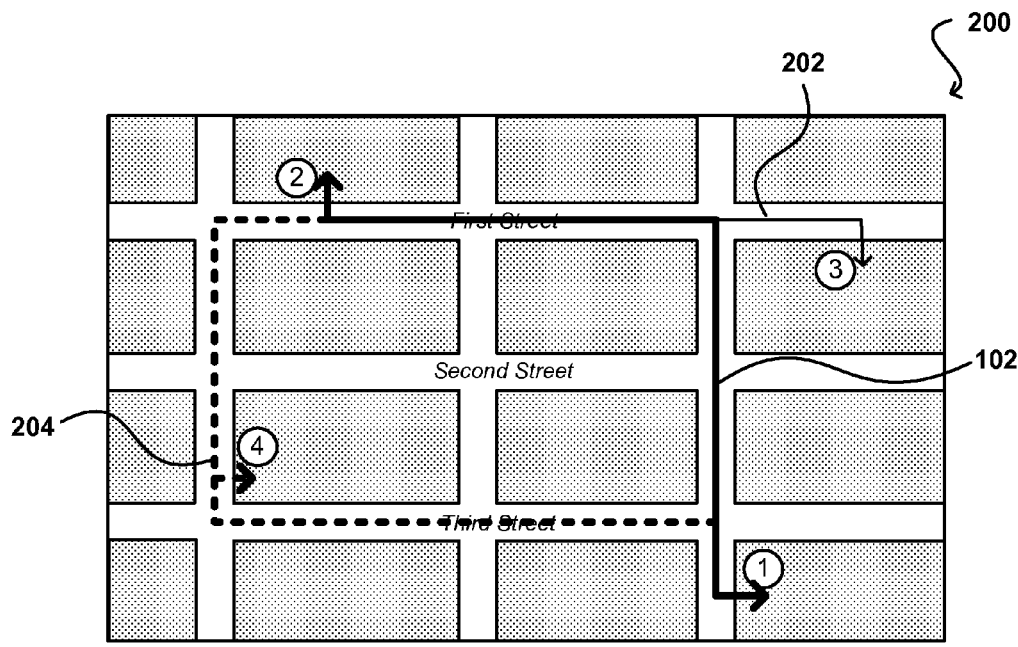
FIG. 2 illustrates an example situation wherein position information is used to determine multiple routes among dwells in accordance with at least one embodiment.

In FIG. 2, dwell position 4 might not correspond to a type of address or be located in the user's contacts. In this example, however, the user may have entries in the user's calendar that say something such as "pick up Junior from practice" or "football practice over." Based on such information, it can be inferred that dwell position 4 corresponds to some type of practice facility or practice field. Further, if the device can determine from the calendar or other information who is being picked up at that field (in this case "Junior") then the device can also make assumptions or inferences about the user picking up Junior at certain times.

In some embodiments, the device might be in contact (directly or indirectly) with one of Junior's devices, which might also provide position information. By aggregating the data, the devices can determine that the user picks up Junior at dwell position 4, and then those users ride together along the alternate route 204 to dwell position 1. Thus, the device might not be able to determine the type of location at dwell position 4, but might be able to identify a certain action that occurs there, such as the user picking up Junior at certain times.

In some embodiments, the ability for the user's device to communicate with Junior's device allows for some additional functionality. For example, Junior can be notified via a communication between the devices that the user is on the way to pick up Junior. Similarly, if the user has not left dwell position 2 in time to pick up Junior, the device can tell the user to take an alternate transportation option. If the device has monitored Junior's routes, the device might know the bus route home or whether Junior can walk home, and can make recommendations based on those routes. In some embodiments, a device can look at the user's calendar, current position, route information, and other such information to attempt to determine a time of arrival for Junior at dwell position 1 (home) if Junior waits for the user, as opposed to taking one of the alternative route options, and can provide recommendations to Junior as to which route would likely get Junior home fastest based on that information.

Figure 3:
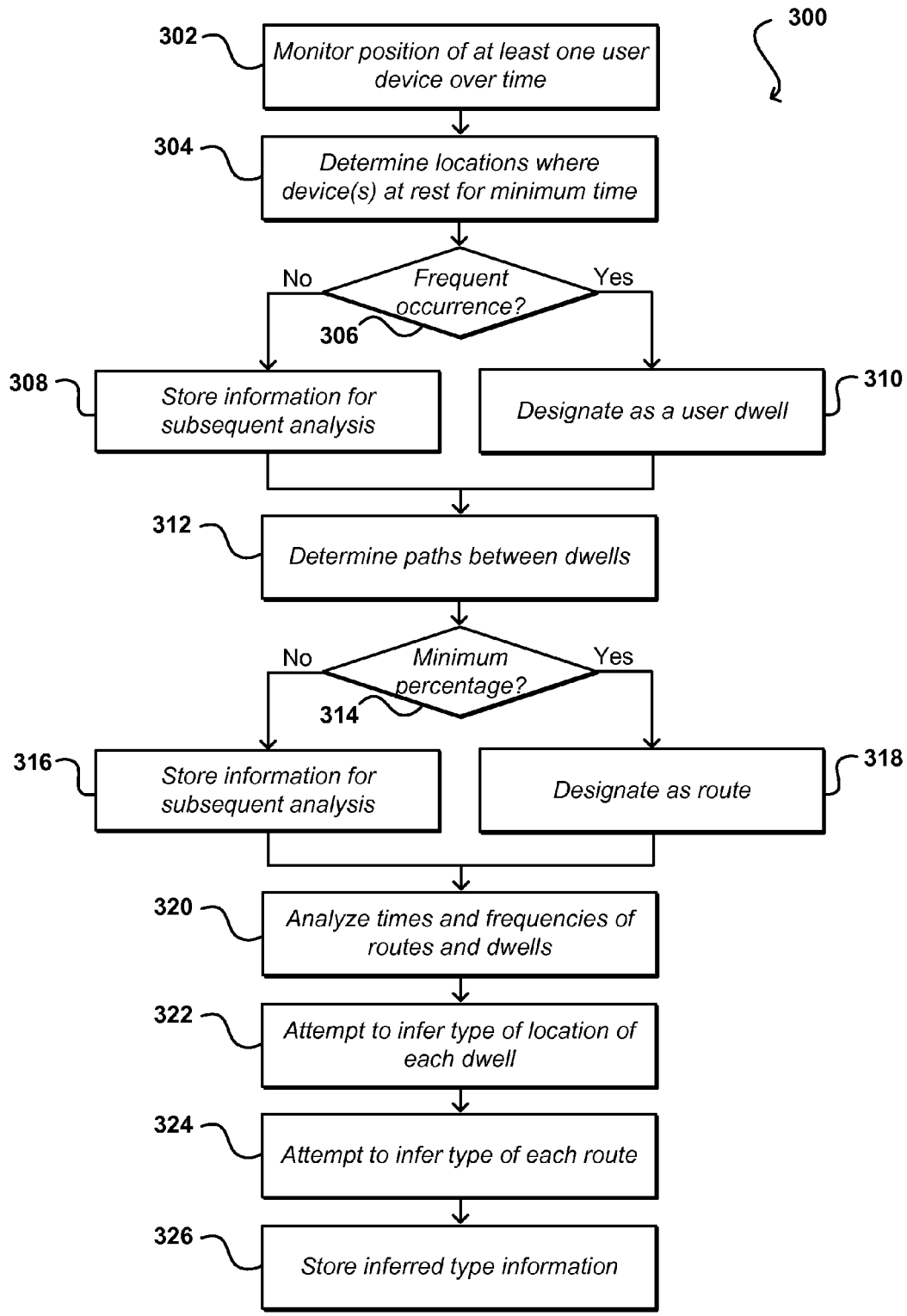
FIG. 3 illustrates an example process for inferring information that can be used in accordance with at least one embodiment.

FIG. 3 illustrates an example process 300 for inferring route and dwell information for a user that can be utilized in accordance with various embodiments. In this example, the position of at least one user device is monitored over time 302. As discussed, a user might have more than one position-determination-capable device, and these devices can communicate with each other or with a system or service over a network, for example, such that if there are multiple devices the data from those devices can be aggregated for analysis. In some cases, a user must activate or login to a device for that device to provide position data, while in other embodiments any movement (or lack of movement) can trigger information to be captured for that user. If multiple users utilize a device, data can be monitored for the user identified to the device, or aggregated with data for both users. In some embodiments, a third party such as a provider or developer can utilize a software development kit (SDK) and one or more application programming interfaces (APIs) or other such components to develop an application, system, or service that obtains specific types of data or primitives (e.g., latitude and longitude data at specific times) from the device for use in monitoring and/or inferring user behavior.

In this example, the locations where a user device is at rest for a minimum period of time can be determined 304. "At rest" can mean different things in different embodiments, as a user device moving around the interior of a home might be considered to be "at rest" or otherwise at the same location, while in other embodiments the movement of the user device inside the home might also be tracked for movement determination purposes. In some embodiments, a device can be considered to be at the same location if the position of the device does not vary by more than a specified distance, such as about three feet (around the length of an adult arm), about ten feet, within a single room as determined by the device, etc. The minimum time also can vary and/or be set by any appropriate entity, such as the user, a provider, or a third party developer. A time window that is too small can result in stops being improperly interpreted as dwells. For example, a user stopped at a stop light or sitting in traffic should not have that "stop" inferred as a dwell. Windows that are too long, however, can miss certain dwells. For example, if a user stops to get gas, orders food from a drive-thru, or performs a similar action, that action might not take more than a minute or two but might be desirable to interpret as a dwell. In some embodiments, GPS data or similar information can be used to attempt to interpret the action. For example, if the user is detected to be stopped on the highway, or at an intersection, then the information should generally not be interpreted as a dwell in most embodiments. In at least some embodiments, there can be specific types of locations that are specifically excluded from being designated as a dwell, in order to simplify the determination.

If, however, the user is detected to be in the vicinity of a potential dwell location such as a restaurant (e.g., within the boundaries of the restaurant property) then the action might be interpreted as a potential dwell. Similarly, the entire time the user is within the bounds of the restaurant property might be considered for dwell purposes, even though the user might be moving through the drive-thru without stopping for more than thirty seconds or so at a time, which might otherwise not register as a dwell. One or more sensors or other components of the device can be used to assist in differentiating various actions, such as distinguishing between a short dwell and a pause during a route, or determining whether the user is moving around in a mall or stopped at a specific location in the mall. In one example, small motions detected by an accelerometer or a gyroscope could note whether the user is substantially at rest, making small movements over a small area, or continually moving within a store or other such location. Various other determination approaches can be used as well.

When a device is detected to be substantially at rest for a minimum period of time, a determination can be made as to whether a rest at that location happens with a minimum frequency 306, or has happened a minimum number of times or with some regularity, or meets some other such threshold or criterion. For example, if the user stops at that location at least once a week, or two Thursdays a month, the location might at least meet a minimum frequency criterion. A threshold or other criterion (e.g., minimum frequency) can be set by any appropriate entity as well, such as the user or a provider or developer. If the location at least meets such a criterion, that location can be designated as a user "dwell" for at least a period of time 310. If the user stops going to that location with the minimum frequency, for example, that location might be removed as a dwell. If the user does not stop at that location with sufficient frequency, for example, information for that location (such as length of the stop, date and time of the stop, etc.) can be stored for subsequent analysis 308.

In this example, the position information monitored for the user can be analyzed to determine which paths were taken by the user to get to at least some of the dwells over at least a recent period of time 312. For example, the information can be analyzed to determine whether the user frequently follows a similar set of directions to get to the location, whether the user frequently leaves the same dwell to get to that location, or goes to the same dwell after that location, or performs another similar action associated with visiting that location. A path can be a path between two dwells, or from a determined point to (or from) a dwell. For example, a user might always turn off a highway at a given exit and take the same path to get to a given dwell, but the origination point where the user started the trip might often be different, and there might be many times where the user takes that highway but does not take that exit. Thus, a path considered for a dwell might be from that highway exit to the dwell.

For paths that are determined for one or more dwells, a determination can be made as to whether a path is followed to, or from, a given dwell, or between dwells, with at least a minimum frequency, percentage of the times the dwell is visited, or other such criterion 314, which also can be specified and/or modified by any appropriate entity, as may be enabled through an interface of the device or other such component. In one example, a user might take the same path to work each morning, only occasionally going along one of a group of different paths when other tasks are performed. The path typically taken to work might occur with sufficient frequency, but the other paths might not, even though those paths pass between the same dwells. For each path meeting the threshold or at least one criterion, the path can be designated as a "route" that should be stored for the user with respect to the at least one dwell corresponding to the route 318. If a path does not at least meet one threshold or criterion, information for that path can be stored for subsequent analysis.

It should be understood that in other embodiments routes can be determined before, separate from, or without dwell determinations. It also should be understood that for the various processes discussed herein there can be additional, fewer, or alternative steps performed in similar or alternative orders, or in parallel, within the scope of the various embodiments unless otherwise stated.

In at least some embodiments, information associated with the routes and/or dwells can be analyzed to attempt to infer various aspects. For example, the times of day and/or days of the week during which a route or dwell occurs can be analyzed, as well as the frequency of those routes and/or dwells 320. For example, the user might follow one route every weekday morning, another route on Sunday mornings only, and another route two days a week (where those days might vary week to week). The dwell destination for the weekday route might have a period of about eight hours, the Sunday morning dwell a period of less than an hour, and the twice weekly dwell about an hour. Based on at least this type of information, the device can attempt to infer the type of location of each dwell 322 and/or the type of location of each route 324. For example, the weekly dwell might meet criteria that indicate the dwell corresponds to the location of the user's job, with the route to that dwell in the morning corresponding to the user's morning commute to work. The Sunday morning dwell and route might meet the criteria for a church or other place of worship. In at least some embodiments, such inferences can be presented to the user for confirmation. Once determined and/or confirmed, the inferred type information can be stored for subsequent use 326.

For dwells such as the twice weekly dwell, the times and frequencies might not meet certain criteria or other factors for being able to infer a type of route with an acceptable level of certainty. For example, the dwell could be a gym, restaurant, or grocery store, a place where the user picks someone up, or any of a number of other such possibilities. In such instances, the device can attempt to utilize other information to assist in the inference determination. For example, the user might have information in a calendar or address book that corresponds to the time and/or location of a dwell. In some embodiments, the device can access address or yellow page information to attempt to associate a type of location (e.g., a store, restaurant, or club) with the position of the dwell. In still other embodiments, the device might attempt to communicate with other devices while at that location to attempt to determine if other devices have information indicative of the type of location. Various other types of information can be used as well.

Figure 4:
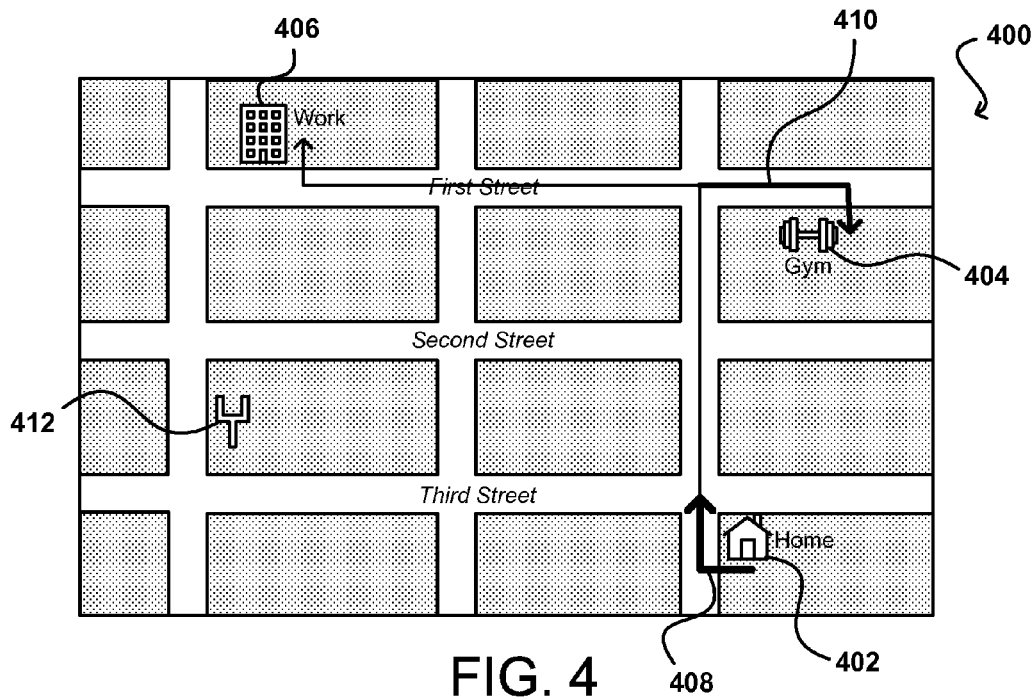
FIG. 4 illustrates an example situation wherein position information is used to infer at least one destination in accordance with at least one embodiment.

Once a set of routes and/or dwells has been determined, the device can attempt to infer information about user activity based on information such as the movement of the user. FIG. 4 illustrates an example map 400 including dwell information that can be used to used to infer upcoming actions or intentions of the user. As can be seen, various destinations have been identified as indicated by icons for the user's home 402, gym 404, and user's place of employment 406. In various embodiments, routes might have been determined that indicate that the user typically leaves for work around 7:30 a.m. on normal work days, and around 6:30 a.m. if the user is first going to the gym. If a user device monitoring position information determines that the user is leaving the house around 6:30 on one of the days that the user usually goes to the gym, it can be inferred that the user is going along the route 410 to the gym 404. The timing in this example can provide an inference with a first level of confidence. When the user begins following at least an initial portion 408 of the route 410 towards either the gym or work, such as by making a right turn out of the driveway, it can be inferred more strongly that the user is going to the gym 404 (e.g., with a second level of confidence). When the user actually turns onto the portion of the route 410 that corresponds directly to the gym 404, it can be strongly inferred that the user is going to the gym (e.g., with a third level of confidence). It should be understood that levels of confidence are merely examples, and that various certainties, thresholds, percentages, and other such approaches can be used as well in various embodiments. Some approaches also might make the inference based on any single factor or combination of these factors, and may only use a single inference determination. For example, if the user leaves around 6:30 a.m. and heads along the route towards the gym 408 or 410, the device might make a single inference determination at the appropriate time.

Figure 5:
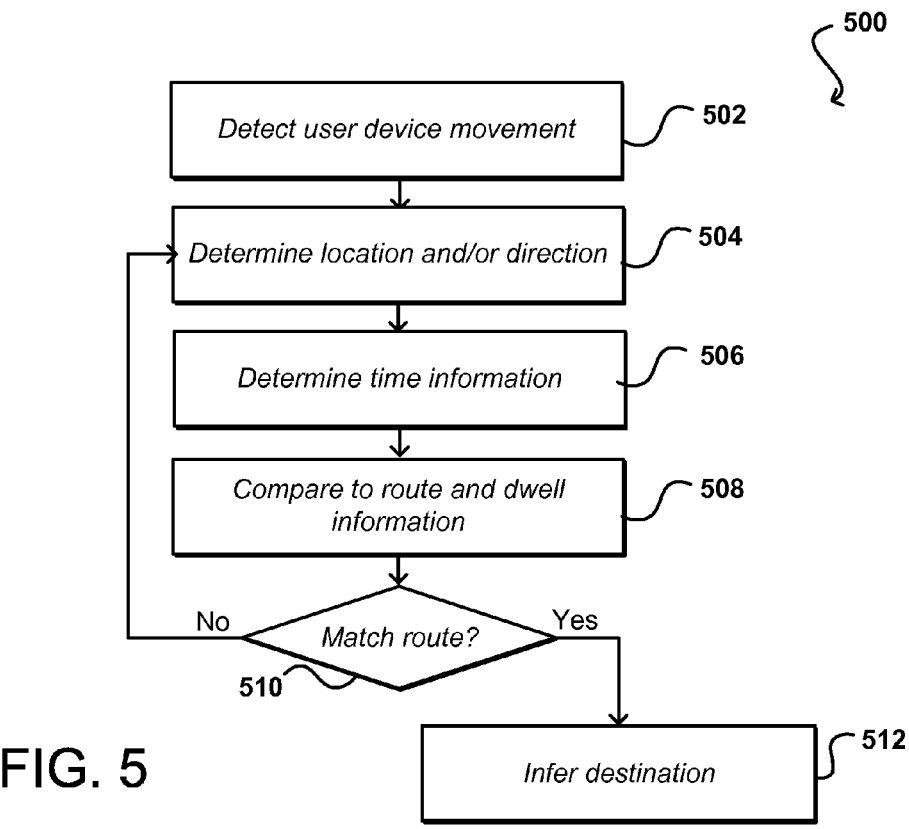
FIG. 5 illustrates an example process for inferring a destination that can be used in accordance with at least one embodiment.

FIG. 5 illustrates an example process 500 that can be used to make such an inference. In this example, movement of the user device is detected 502. As discussed, in at least some embodiments position information might not be determined and/or monitored until the device moves at least a minimum distance, as may be determined by a GPS element or accelerometer, or through image analysis or another such approach. In other embodiments, the determinations might be made at any or all times, regardless of device movement. The location and/or direction of movement of the device can be determined 504, as well as potentially other information such as speed or acceleration, which can help to determine not only that the user is leaving the driveway but in which direction the user is facing and/or heading. For example, if the device determines that the vehicle is heading south out of the driveway but is backing up slowly and coming to a stop, the device can determine that the vehicle is likely actually in reverse in order to position the vehicle to eventually head north. The approximate time also can be determined 506. The time information, along with any position, direction, and/or movement information, can be compared to the route and/or dwell information 508. A determination can be made as to whether the information matches a route with a minimum degree of certainty or confidence, etc. 510. For example, in some embodiments a route might have to be followed within a certain time period, such as within fifteen minutes of a typical route start time or within a certain fraction of time of the overall route length. Further, in some embodiments the user might be able to deviate a given amount from the route, such as to catch a different entrance ramp to the highway or take a street that runs substantially parallel to the highway. Various other allowances can be considered as well. If the information matches a stored route, the device can infer at least one destination of the user along the route 512. In the above example, the device might determine based on the time and route that the user is going to the gym for about an hour, and then likely will drive straight to work (each being a dwell corresponding to one or more routes). In some embodiments, the route from the home to the gym might be considered to be a different route than the route from the gym to work, while in other embodiments there can be a single route which may consider the gym as a "waypoint" or similar dwell along the route between home and work.

Being able to make such inferences enables a device, or a system or service in communication with that device, to offer a variety of functions to the user. For example, if the device infers that the user is going to the gym, and the device knows that the user normally works out for at forty-five minutes at the gym, the drive to work takes at least fifteen minutes, and the user has an appointment in an hour, the device might recommend to the user that the user skip the gym or shorten the workout in order to make the meeting. In some embodiments, the device can send an update to other devices (such as a device for a spouse or assistant) notifying that the user is stopping at the gym on the way to work, and providing an estimated time of arrival at work. In other embodiments, the device can push back the meeting by sending a communication to a scheduling application, system or service, in order to ensure the user has enough time to both work out and make the meeting. In some embodiments, the device can notify the user when the user must complete an activity (here, finish working out) in order to make the appointment. Various other options can be used as well.

Figure 6:
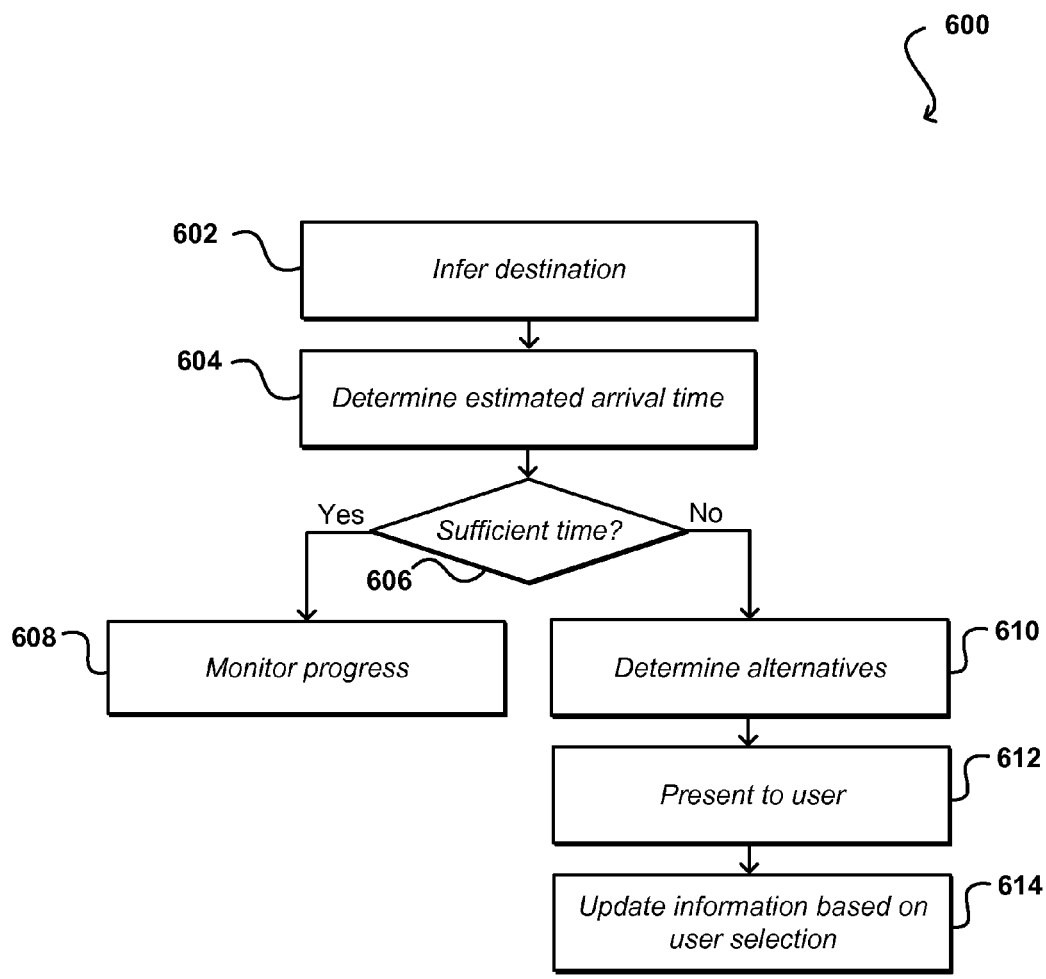
FIG. 6 illustrates an example process for suggesting alternative information based in part upon inferred information that can be used in accordance with at least one embodiment.

FIG. 6 illustrates an example process 600 for utilizing route and time information that can be used in accordance with various embodiments. In this example, the destination of the user is inferred 602, such as by using a process such as that described with respect to FIG. 5. The device can determine the estimated arrival time of the user at that destination 604, such as by using typical route length information, current location and rate of travel information, and other such readily determinable information. As discussed elsewhere herein, the device also can use other information as well, such as real time traffic information or weather information (i.e., use a different average time during snow than during clear weather). If available, the device can obtain information such as the wait time at the destination, such as the length of line at the coffee shop. The device can determine a time at which the user should arrive at the dwell or destination. This time can be the typical time the user arrives, as may be based on historical or monitored information, or can be based on information from a user calendar or task list, etc. The recommended time of arrival also can take into account other information, such as the additional amount of time the user will have to wait in line. The device can determine whether the user likely has sufficient time to make it to the destination by the determined time 606, as well as other information such as whether the user will have sufficient time at the destination, whether the user will be able to make it back from the destination (or to the next location) in time, etc. If the user has sufficient time, the device can maintain the information for the current route, destination, etc., and continue to monitor progress 608. The device also can update determinations as to whether the user will make the destination on time, the estimated actual time of arrival, and other such information. If the user likely does not have sufficient time, the device can determine one or more alternatives 610, such as by selecting a potentially faster route (or better destination) or determining whether the target time of arrival can be adjusted (e.g., move a meeting time to compensate for any anticipated delay). In at least some embodiments the device can take certain actions automatically, such as by automatically moving an appointment or adjusting the route in a navigation system to be followed by a vehicle, while in various embodiments the device can prompt the user to take one of these actions or otherwise present one or more alternatives to the user 612. The presentation can be any appropriate presentation, such as an audio or visual notification, while an action can be any instruction or communication generated for a specific person, device, or address to cause a certain function to occur. Based on user selection, which can be based on physical, audio, or visual input, for example, and/or any actions taken, the device can update information as appropriate 614, such as to adjust the route, time of arrival, a meeting time, or any other such action discussed or suggested herein.

In some embodiments where the device has access to traffic information, the device might determine that there is an accident or construction along the normal route to the gym, and might direct the user to take a different route. If the vehicle has an automatic navigation system, the device can cause the route to be adjusted automatically (if enabled by the user) and, if so configured, can cause the vehicle to automatically follow the new route or at least prompt the user or an operator of the vehicle to follow the new route. In some embodiments where the device can determine before starting a route that the commute will be longer, the device can notify the user that the user should leave earlier. The device also can provide alternatives before the user begins a route. For example, if the device determines that the user does likely not have enough time to both go to the gym and make a meeting, the device can suggest that the user skip the gym or move the meeting. In some cases, the device can enable the user to make alternative arrangements as well, such as by opening the calendar for the user or providing a number to dial an assistant or colleague, etc.

Figure 7:
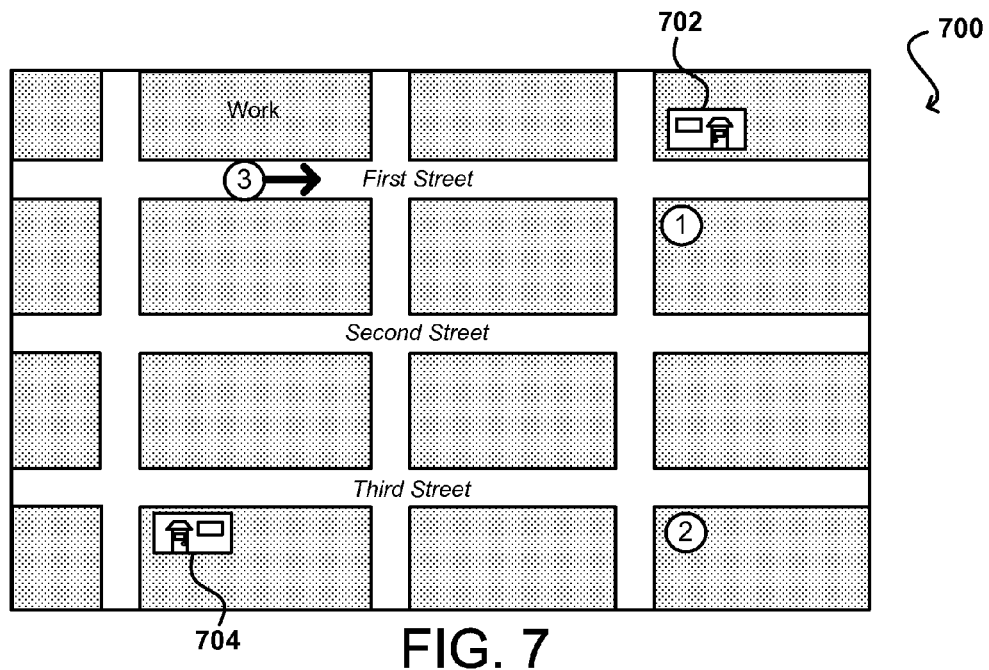
FIG. 7 illustrates an example situation wherein position information is used to select a destination for multiple users in accordance with at least one embodiment.

In addition to inferring destinations, arrival times, and other such information, a device can also select or determine other types of information based upon location information for one or more devices for one or more users. For example, a user might always get together with two other people for lunch on Fridays, or there might be an entry on the user's calendar that the user is having lunch with those two people. In some embodiments, the device can perform various tasks based at least in part upon the location of each of those people. For example, FIG. 7 illustrates an example situation 700 wherein there are three people at three different locations. User 1 and user 2 are stationary, and user 3 is traveling eastbound on First Street. In some embodiments, the device might determine restaurants where the users typically meet, restaurants that each of the users has previously visited, restaurants that meet each user's preferences, or any other appropriate locations. From these selections, the device can filter out any locations where any of the users will be unable to reach by the scheduled time based on current location, traffic, and other such information. In some embodiments, the device might select the restaurant that is closest to all three users, such as restaurant 702 instead of restaurant 704, or that can be reached most quickly by all three users. The device can take other factors into account as well. For example, if it would be slightly quicker for the users to meet at restaurant 702, but those users met there last time, the device might instead suggest restaurant 704. Various other considerations can be utilized as well. In some embodiments the users might be presented with one or more options, which the users approve or vote on, etc. When a restaurant is selected, the calendar for each user can be updated, and reservations or arrangements made as necessary.

Figure 8:
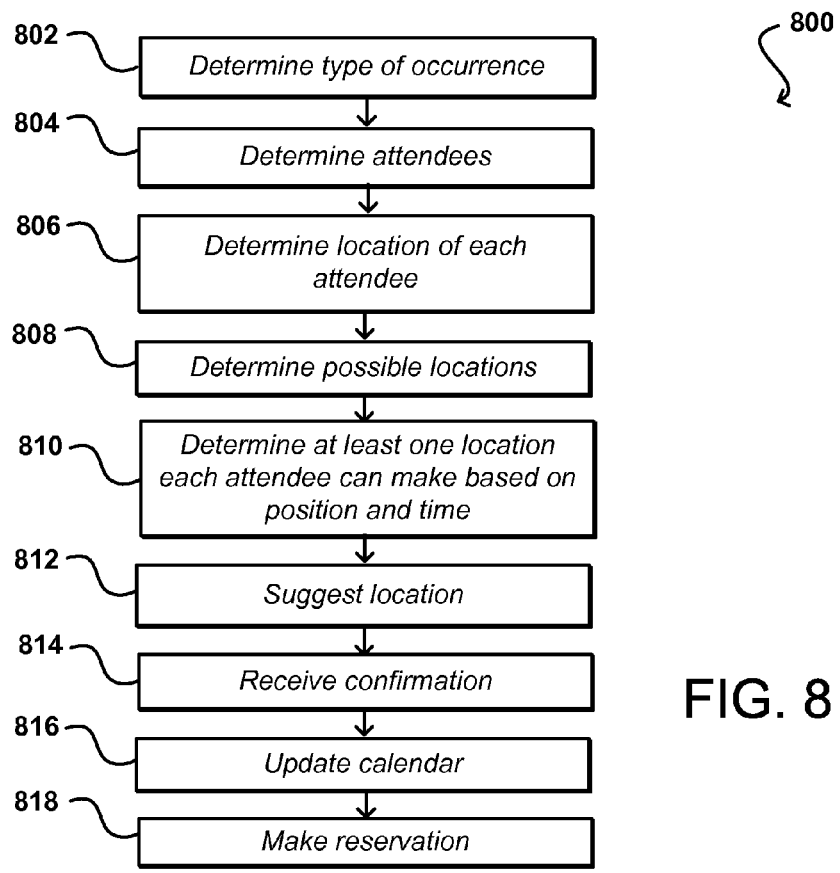
FIG. 8 illustrates an example process for suggesting a destination for multiple users that can be used in accordance with at least one embodiment.

FIG. 8 illustrates an example process 800 for performing such a determination that can be used in accordance with various embodiments. As discussed above, such a process can be performed by a single entity, while at least certain portions can be performed by a third party using one or more interfaces to obtain information, provide instructions, or otherwise interact with the device. In this example, the device can determine the type of a scheduled occurrence 802, such as by analyzing the words on a calendar entry or looking at the historical reasons for a group of people to get together at a certain time. The device also can determine the attendees using a similar approach 804. The device can attempt to determine the current location (and potentially direction and movement) of the other users 806, such as by contacting a device for each user or a central service in communication with each device. Using at least the determined current (or future incurred) location information, the device can determine possible locations for the persons to meet 808, and from those possible locations determine at least one location that each attendee can make by the scheduled time based upon the current location information (and potentially any schedule, route, or other appropriate information) 810. The device then can suggest at least one location 812, and receive confirmation from the users 814, where unanimous or majority approval might be required. Upon receiving confirmation, the device can perform any appropriate action as discussed, such as to update the calendars for each user 816 and/or make a reservation 818 for that number of attendees at the selected destination.

Figure 9:
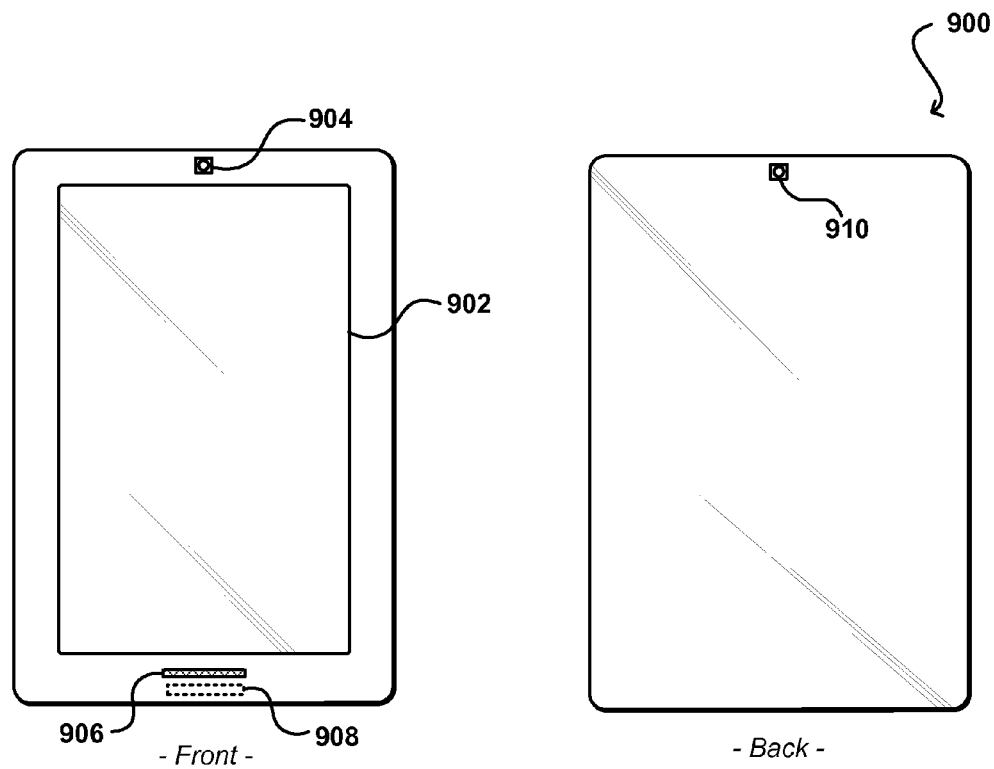
FIG. 9 illustrates front and back views of an example user device that can be utilized in accordance with various embodiments.

FIG. 9 illustrates front and back views, respectively, of an example user device 400 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 900 has a display screen 902 on the front side, which under normal operation will display information to a user facing the display screen (e.g., on the same side of the computing device as the display screen). The computing device in this example includes a front image capture element 904 and a back image capture element 910 positioned on the device such that, with sufficient wide angle lenses or other such optics, the computing device 900 is able to capture image information in substantially any direction about the computing device. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 900 also includes a microphone 906 or other audio capture device capable of capturing audio data, such as words or commands spoken by a user of the device. In this example, a microphone 906 is placed on the same side of the device as the display screen 902, such that the microphone will typically be better able to capture words spoken by a user of the device. In at least some embodiments, the microphone can be a directional microphone that captures sound information from substantially directly in front of the device, and picks up only a limited amount of sound from other directions, which can help to better capture words spoken by a primary user of the device.

The example computing device 900 also includes at least one position and/or orientation determining element 908. Such an element can include, for example, an accelerometer or gyroscope operable to detect an orientation and/or change in orientation of the computing device, as well as small movements of the device. An orientation determining element also can include an electronic or digital compass, which can indicate a direction (e.g., north or south) in which the device is determined to be pointing (e.g., with respect to a primary axis or other such aspect). A location determining element also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 10:
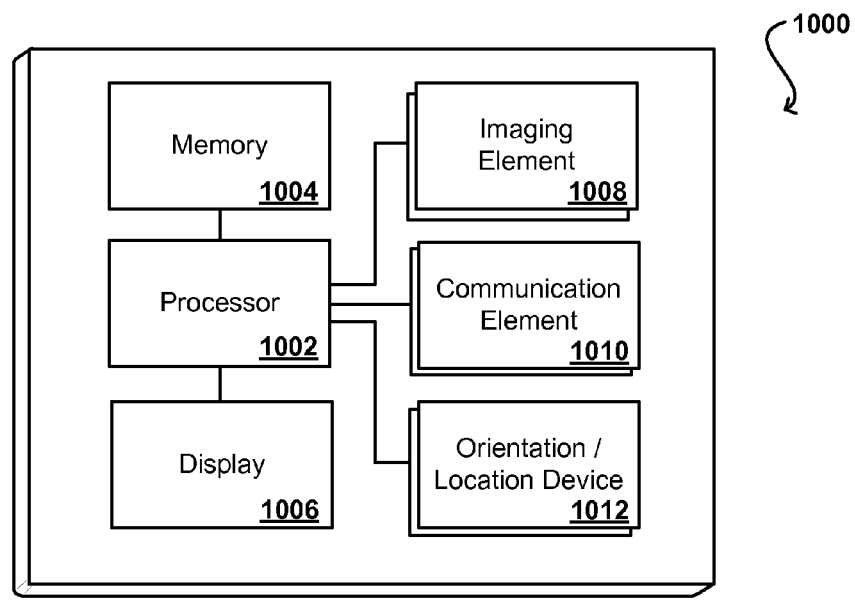
FIG. 10 illustrates example components of a user device that can be utilized in accordance with various embodiments.

FIG. 10 illustrates a logical arrangement of a set of general components of an example computing device 1000 such as the device 900 described with respect to FIG. 9. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one image capture element 1008 such as a camera or infrared sensor that is able to image projected image or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

In some embodiments, the computing device 1000 of FIG. 10 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1000 also will include at least one orientation, movement, and/or location determination mechanism 1012. As discussed, such a mechanism can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1002, whereby the device can perform any of a number of actions described or suggested herein.

Figure 11:
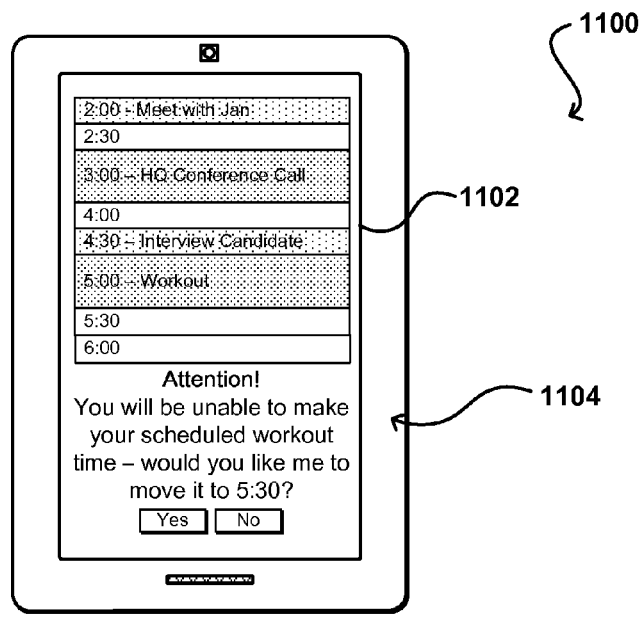
FIG. 11 illustrates an example suggestion that can be presented to a user via an interface in accordance with various embodiments.

The processor 1002 also can execute one or more applications on the device to convey information to the user, receive instructions, and provide other such functionality. For example, FIG. 11 illustrates an example device 1100 wherein there is a message 1104 presented to the user via a display element 1102 on the device. In this example, the device has determined that the user will likely be unable to make the scheduled workout appointment, due to adjacent meetings, current location, speed and heading of the user, or other such information. In this example, the device displays an option to the user, using an approach as discussed above, and enables the user to select an appropriate option.

Such an approach can be used to provide a variety of services for the user. For example, the device can suggest the best route to take to work or return home based on time of day and day of week. The device can ask to reschedule meetings where the attendees are determined to be unable to make the meeting on time due to their current location. If users are determined to be near each other, the device can provide a notification and ask if the user would like to meet up with the other user. If there are places that a user needs to go that are determined to be along the inferred route, the device can prompt the user to stop at that location if the user will have enough time based on current conditions. Various other services can be provided as well.

Figure 12:
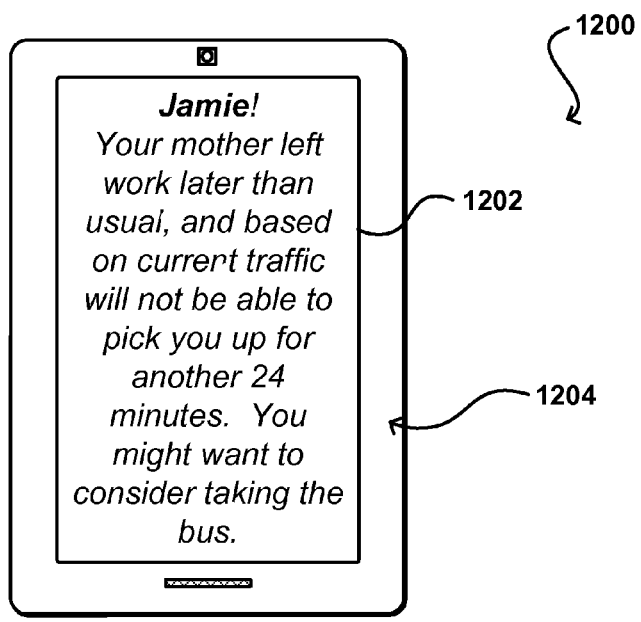
FIG. 12 illustrates an example notification that can be presented to a user via an interface in accordance with various embodiments.

For example, referring back to FIG. 4, a parent might typically stop by a practice field 412 to pick up a child on the way home from work 406. In some embodiments, the user device can be in communication with the child's device to determine whether the child is at the practice field before the user leaves work. If the child is not at the field, the user device can notify the user that the user does not need to pick up the child. If along the route to the field the child leaves the field, as determined based on the location of the child's device, a notification can be sent to the user device indicating that the child is no longer at the field, and can provide current location information and, if possible, known or inferred information about the destination of the child. Similarly, if the user does not leave work on time or if there is traffic that will cause the user to be late to the field, the user device can cause the child to be notified via the child device that the user will be unable to reach the field at the normal time, and in some embodiments can provide an estimated time of arrival. For example, consider the device 1200 in FIG. 12. In this example, a notification 1204 is generated on a display element 1202 of a child's user device 1200. The notification indicates to the child that the parent is running late, and indicates that the parent will not be able to arrive for about twenty-four minutes. In this example, the device also analyzes one or more alternatives, as discussed above, and suggests an option to the child. In this example, the bus will be leaving soon and will get the child home sooner than if the child waits for the parent, so the device recommends that the child take the bus. Such a determination can take into account various other factors as well, such as whether the parent will be able to get home sooner as well by not having to pick up the child. If the child is detected to take the bus, a user device can notify the parent of the change, and can suggest an alternate route to take to get home quickly from the current location. An updated time of arrival can also be sent to a spouse or other person indicating when the parent and/or child will arrive home. Various other options can be provided as well.

A user device also can work with various other types of data to make suggestions based on various inferences. For example, the device can access a user's to-do list, a shopping list, an inventory count, or other such information to determine any of a number of different tasks that a user might want to perform. Based on information such as a user's inferred route and time until the user's next activity, a user device might suggest certain actions to the user. For example, if the user is likely driving home from work and will pass by the cleaners, which has shirts to be picked up, and the user will have time to pick up those shirts, the device might recommend to the user to pick up the shirts on the way home from work. Such notification can be sent before the user leaves, along the route, or at any other appropriate time. The device also can look at calendar or other information to proactively place information on the user's calendar. For example, if the user has to go to the bank, and on a certain day the user will pass by that bank between appointments with sufficient time, the user device can add a recommended task to the calendar to stop at the bank. In some embodiments, this task can be in a different color or font, or otherwise designated such that the user will know that the device placed that task on the calendar as a recommendation.

In another example, the user might have received an email message or text message from a family member indicating that the member needs something. If the device determines, based on an inferred route, that the user will drive by a store that has that item in stock, or can make a small detour to go by such a store, and the user has sufficient time, the device can suggest that the user go to that store and pick up the item. In some embodiments, the device will only suggest a store or other location that the user has visited previously, while in other embodiments the device can suggest any appropriate store, etc.

A device can also monitor user behavior along a route and use that information to make certain recommendations or inferences as well. For example, if a user always calls the user's spouse when the user leaves work, the device might prompt the user to call the spouse when the user leaves work, or even automatically dial the spouse. In some cases, the device might ask the user if the device should automatically notify the spouse whenever the user leaves work. If the user always calls at a certain point along the route, for example, the device can prompt the user at that time, or make the call at that time. The device can consider other information as well, such as the direction of travel, time of day, point of origination, day of the week, etc.

A device can also proactively schedule and/or reschedule certain tasks for a user. For example, a user might visit a relative two days a week in the afternoons, but the exact time and date might not matter. In at least some embodiments, the device can proactively place times on the schedule for the user to visit, which might correspond to the times the user is most likely to go based upon historical information and the user's schedule for a given week. If a meeting comes up that conflicts with one of these times, the device can automatically move the visit time to the next logical time and date. In some embodiments, tasks can be given priorities or other such ratings such that the device can know which meetings or tasks to move for others. In some cases these priorities will be specified by the user, while in other embodiments the priorities can be inferred based upon which types of meetings or tasks the user moves, cancels, etc. A user can setup a rule, implicitly or explicitly, such as the user requiring two visits a week unless otherwise indicated by the user. Thus, if there is only one time left in a week for the second visit, the device might determine that the scheduled visit cannot be moved (or at least cannot be moved for anything other than critical tasks, etc.) Further, the device can use information such as average route time, current location, scheduled location, and other such information to determine whether the user will have enough time at the scheduled time, or if the schedule should be adjusted to allow the appropriate amount of time for each task.

A device can also perform other tasks proactively. For example, the user can specify an option that directs the device to make sure the user periodically meets with various business contacts. Thus, the device can monitor how long it has been since the user met with a particular contact, and can potentially prompt the user to setup a meeting. If the device can access the other person's device, calendar, etc., the device can potentially setup a lunch or other such meeting. Using approaches discussed above, devices for the user and the other attendees of the meeting can agree on a restaurant or other location based on position, schedule, timing, and other such information. If a user indicates that the user wants to see a play or musical act, the device can periodically check for tickets and, if tickets become available that match certain criteria (e.g., within a specified distance, within a certain price range, etc., as may be implicitly specified or inferred) then the device can purchase tickets and place the event on the user's calendar. Various other such actions can be performed proactively as well.

In addition to types of information obtained as discussed above, devices in accordance with various embodiments can record or obtain information about anything happening around or associated with the user that can help to infer certain types of information. For example, a device can record and analyze sound around the user to attempt to determine particular types of information. For example, the device could analyze sound to attempt to determine if the user is in a car, on a boat, or on a plane. The device also could analyze sound to attempt to determine, via voice recognition or a similar process, which other people are interacting with the user. If the device has at least one image capture element (e.g., a video camera) the device can also attempt to determine the location, surrounding persons, and other such information using image analysis or other such approaches. In one embodiment, a device might store information that a user is to inform another person, and when the device detects that other person the device can prompt the user to convey that information, or can automatically convey to that person's device. If a device detects a user in a certain type of location, such as in a music store at the mall, the device can notify the user if the user had previously indicated interest in a certain type of musical item. Visual and audio information can be beneficial in locations such as a mall where the device might not be able to determine the type of store or location the user is in based upon GPS data, as the GPS data might not be accurate inside and/or the GPS information might correspond to the mall but not the location of the actual stores, particularly for multi-level structures.

In some cases, stores or other locations might be configured to emit signals that might not be perceptible to a human, but that might be detectable by a user device. These can be, for example, audio signals of a certain frequency, IR signals, or other signals that the user cannot detect. Thus, a device might be able to obtain information about a current location by receiving and analyzing these signals. Coded signals can be used to convey other information to the device as well, such as sale information, recommended products, coupons, etc. In some embodiments, the device might have an RFID detector that can infer the type of location based upon the types of RFID tags that are detected nearby. Various other types of input can be used as well.

It should be understood that routes and dwells also can include places where the user walks, jogs, etc. For example, if the user walks to a corner coffee shop each day at a certain time to get coffee, the device can infer that the user will do that again on any given day. If the user orders the same drink, which the device can determine, the device can place an order for that drink near the appropriate time, or when the user starts walking along the inferred route to the coffee shop, etc. If the systems are tied in, the device also can cause the drink to be paid for using an account or credit card such that the user can simply walk into the shop and pick up the drink. If the device detects a co-worker at the coffee shop, the device can contact another device for that co-worker and prompt the co-worker to pick up and bring back the coffee. If the user typically goes to coffee with other people, the device can contact those other people when it is near the time to go for coffee, or when the user starts taking the route, etc.

In some cases where the user allows, such information also can be shared with various other entities, such as developers, marketers, corporations, etc. The information can be individual information, information aggregated with other user information, information devoid of personally identifying information, etc. For example, a company might be able to determine how far users are willing to drive to go to a particular store. A company also can track how often users visit certain locations, and various other types of information. In some cases, inferences for a user can be determined based at least in part upon similar actions taken by, or inferences made for, other users.

Devices also can infer how often users wish to be prompted for certain types of information, or have various other actions taken. Certain users will like to be notified more often than others, and devices can attempt to learn (and/or infer) these preferences over time based on user actions, such as how often a user likely looks at a notification (based on accelerometer data or other such information), how often a user requests to not be reminded again for certain information, etc. Based on which recommendations the user follows, the device also can infer some importance for different types of actions for that user.

Being able to infer routes and destinations also can enable such information to be shared for social networking purposes. For example, if a device infers that a user is going to a particular store or restaurant, and the user is willing to share such information, the device could share that the user is heading to that location, and might even include a purpose. For example, the device could cause a status update to be posted to a social networking site such as "Joe is on his way to dinner at Jonny's Diner." If some of Joe's friends are detected near Jonny's and their schedule allows, the device might cause prompts to be sent to those friends to join Jonny at the restaurant.

Figure 13:
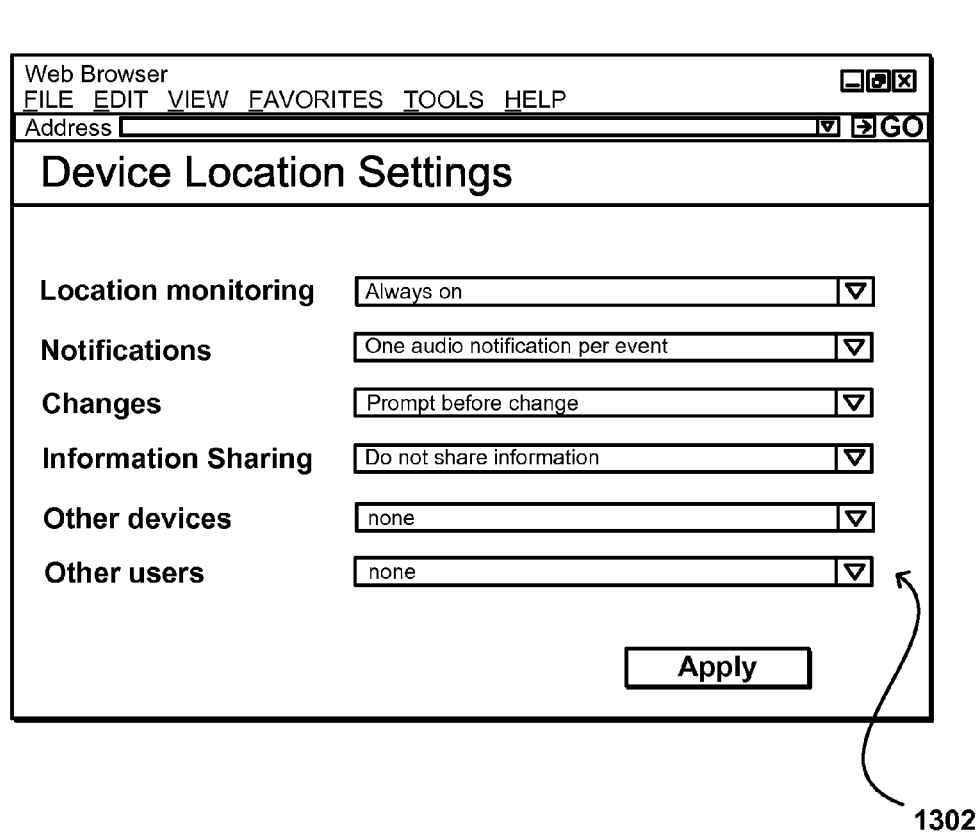
FIG. 13 illustrates an example configuration interface that can be presented to a user via an interface in accordance with various embodiments.

As discussed, much of this functionality can be configured by the user. For example, FIG. 13 illustrates an example interface 1300 wherein a user is presented with a variety of configurable options 1302. In this example the options are presented as drop-down boxes, but it should be understood that any other appropriate elements such as radio buttons, checkboxes, text boxes, or other such interface elements can be used as well within the scope of the various embodiments. In the example options displayed, a user is able to specify selections for the device, such as always having position monitoring active, not sharing information with third parties, prompting the user before making changes to the user's schedule, etc. Various other options can be specified as well, as discussed and suggested herein.

Further, as discussed above, much of this functionality can be pushed off into the cloud, or otherwise performed by a system or service remote from a user device. For example, the device could determine position information and send that information over a network to an inference service, which can analyze information for that user to attempt to determine routes, dwells, and other such information. User calendar information might also be provided by a service, which can work with the inference service to adjust the user's schedule and perform other such functions. As discussed, various user devices can also communicate and work together to perform various functionality as discussed herein.

Figure 14:
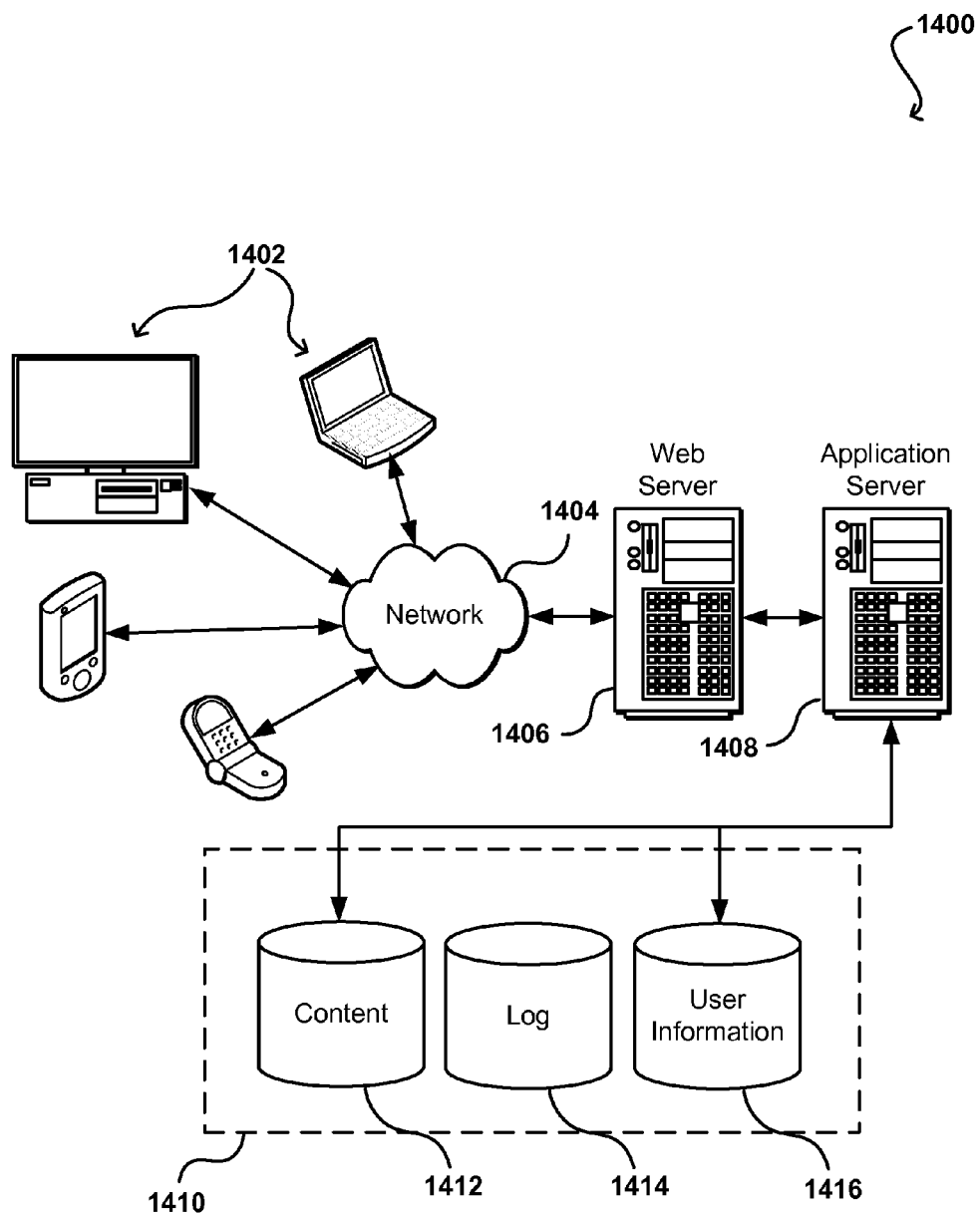
FIG. 14 illustrates an environment in which various embodiments can be implemented.

As discussed, different approaches can be implemented in various environments in accordance with the described embodiments. For example, FIG. 14 illustrates an example of an environment 1400 for implementing aspects in accordance with various embodiments. As will be appreciated, although a Web-based environment is used for purposes of explanation, different environments may be used, as appropriate, to implement various embodiments. The system includes an electronic client device 1402, which can include any appropriate device operable to send and receive requests, messages or information over an appropriate network 1404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1406 for receiving requests and serving content in response thereto, although for other networks an alternative device serving a similar purpose could be used, as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1402 and the application server 1408, can be handled by the Web server 1406. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
monitoring, using a global positioning system (GPS), first location information of a first electronic device associated with a user over at least a first period of time;
storing the first location information for the first electronic device;
monitoring second location information of a second electronic device associated with the user over at least a second period of time after the first period of time, the second electronic device being different from the first electronic device;
storing the second location information for the second electronic device;
analyzing the first location information and the second location information using at least one pattern detection algorithm to identify at least one route and at least one dwell, the at least one dwell corresponding to an approximate range of time and an approximate location where the user was located for at least a minimum amount of time with a first minimum occurrence value, the at least one route corresponding to at least one path that is to, from, or includes the at least one dwell with a second minimum occurrence value;
determining third location information using at least one of the first electronic device or the second electronic device over a third period of time after the second period of time; and
determining a location of the user for at least one future time based at least in part on the third location information and information associated with the at least one route and the at least one dwell.

2. A non-transitory computer-readable medium including instructions, the instructions when executed by a processor of a computing device causing the computing device to:
monitor, using a GPS, first location information of the computing device over at least a first period of time, the computing device associated with a user;
monitor second location information of a second computing device associated with the user over at least a second period of time after the first period of time, the second computing device being different from the computing device;
analyze the first location information and the second location information to identify a route and a dwell;
determine third location information using at least one of the computing device or the second computing device over at least a third period of time after the second period of time; and
determine a location of the user for at least one future time based at least in part on the third location information and information associated with the route and the dwell.

3. The computer-implemented method of claim 1, further comprising:
storing user behavior information, including one or more actions with respect to at least one of the first electronic device or the second electronic device, at times corresponding to the information associated with the at least one route and the at least one dwell; and
detecting an action with respect to the at least one of the first electronic device or the second electronic device, wherein the action includes following at least a portion of the at least one route, arriving at the at least one dwell, leaving the at least one dwell, completing a task, or inputting information into the at least one of the first electronic device or the second electronic device, and
wherein the location of the user for the at least one future time is further determined based at least in part by comparing the action with the user behavior information.

4. A computer-implemented method, comprising:
monitoring, using a GPS, first location information of a first electronic device associated with a user over at least a first period of time;
monitoring second location information of a second electronic device associated with the user over at least a second period of time after the first period of time, the second electronic device being different from the first electronic device;
analyzing the first location information and the second location information to identify a route and a dwell;
determining third location information using at least one of the first electronic device or the second electronic device over at least a third period of time after the second period of time; and
determining a location of the user for at least one future time based at least in part on the third location information and information associated with the route and the dwell.

5. The computer-implemented method of claim 4, wherein the second location information includes at least one of a position, rate of movement, acceleration, direction of movement, path of movement, or duration of movement.

6. The computer-implemented method of claim 4, wherein the dwell corresponds to an approximate location visited for at least a minimum period of time, and
wherein the route corresponds to at least one path to, from, or including the dwell.

7. The computer-implemented method of claim 6, wherein roads are excluded from being determined as dwells.

8. A computing device, comprising:
a processor;
a GPS; and
a memory device including instructions that, when executed by the processor, cause the computing device to:
monitor, using the GPS, first location information of the computing device over at least a first period of time, the computing device associated with a user;
monitor second location information of a second computing device associated with the user over at least a second period of time after the first period of time, the second computing device being different from the computing device;
analyze the first location information and the second location information to identify a route and a dwell;
determine third location information using at least one of the computing device or the second computing device over at least a third period of time after the second period of time; and
determine a location of the user for at least one future time based at least in part on the third location information and information associated with the route and the dwell.

9. The computing device of claim 8, wherein the instructions when executed further cause the computing device to:
perform at least one task based at least in part upon the location of the user for the at least one future time.

10. The computer-implemented method of claim 4, further comprising:
obtaining position data, from an accelerometer, and storing at least a portion of the position data with a time of occurrence as at least a portion of the second location information.

11. The computer-implemented method of claim 4, wherein the location of the user for the at least one future time is further determined based at least in part on at least one of calendar, task, address, schedule, or contact information.

12. The computer-implemented method of claim 4, further comprising:
based at least in part upon the location of the user for the at least one future time, performing at least one task using at least one of the first electronic device or the second electronic device.

13. The computer-implemented method of claim 12, wherein the at least one task includes at least one of prompting with second information based on the at least one task, contacting another device with third information about the at least one task, obtaining additional information about the location of the user for the at least one future time, moving a scheduled item based on the location of the user for the at least one future time, or scheduling an item based on the location of the user for the at least one future time.

14. The computer-implemented method of claim 4, further comprising:
determining whether the user will arrive at a scheduled meeting at or before a scheduled time.

15. The computer-implemented method of claim 14, further comprising:
determining that the user will arrive at the scheduled meeting after the scheduled time; and
performing at least one of moving the scheduled meeting, rescheduling the scheduled meeting, sending a notification, suggesting different routes to the scheduled meeting, or suggesting at least one alternative action.

16. The non-transitory computer-readable medium of claim 2, wherein the instructions when executed further cause the computing device to:
perform at least one task based at least in part upon the location of the user for the at least one future time.

17. The computer-implemented method of claim 12, wherein the at least one task includes at least one of making an appointment, making a reservation, modifying performance of the at least one of the first electronic device or the second electronic device, determining available options, or requesting input.

18. The non-transitory computer-readable medium of claim 16, wherein the at least one task includes at least one of making an appointment, making a reservation, contacting a second user or a third computing device, adjusting performance of at least one of the computing device or the second computing device, determining available options, or requesting input from the user.

19. The computer-implemented method of claim 4, further comprising:
storing user behavior information, comprising one or more actions, with respect to at least one of the first electronic device or the second electronic device at times corresponding to the information associated with the route and the dwell; and
detecting an action with respect to the at least one of the first electronic device or the second electronic device,
wherein the one or more actions include at least one of being near a specific position, having a rate of movement, having a direction of movement, following a path of movement, or having a duration of movement,
wherein the location of the user for the at least one future time is further determined based at least in part by comparing the action with the user behavior information.

* * * * *